(12) United States Patent  
Bailey et al.

(10) Patent No.: US 7,523,669 B1  
(45) Date of Patent: Apr. 28, 2009

(54) METHOD FOR STRENGTH TESTING OF DRAWERS IN COMPUTER RACK SYSTEMS

(75) Inventors: David J. Bailey, Rochester, MN (US); Robert F. Hyland, Fond du Lac, WI (US); Marvin M. Misgen, Rochester, MN (US); Joseph F. Prisco, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/111,333

(22) Filed: Apr. 29, 2008

(51) Int. Cl.  
*G01B 5/30* (2006.01)

(52) U.S. Cl. .......................... 73/760; 312/352

(58) Field of Classification Search ........... 73/760–856; 312/351.1, 252  
See application file for complete search history.

(56) References Cited

U.S. PATENT DOCUMENTS

| | | | |
|---|---|---|---|
| 1,596,225 A * | 8/1926 | Andersson | ................... 220/559 |
| 6,557,420 B1 | 5/2003 | Garcia et al. | |
| 6,918,306 B1 | 7/2005 | Cavallaro et al. | |
| 6,972,948 B1 * | 12/2005 | New | ........................... 361/683 |
| 2005/0109119 A1 | 5/2005 | Roe et al. | |
| 2005/0117709 A1 * | 6/2005 | Dippl et al. | ................. 378/189 |
| 2008/0289544 A1 * | 11/2008 | Buitmann et al. | ............. 108/20 |

\* cited by examiner

*Primary Examiner*—Max Noori  
(74) *Attorney, Agent, or Firm*—Cantor Colburn LLP

(57) ABSTRACT

Disclosed is a method of strength testing of a drawer of a computer rack system. The method utilizes a test apparatus including a first apparatus plate and a second apparatus plate positioned to define an apparatus slot between the first apparatus plate and the second apparatus plate. The apparatus includes a moveable positioning arm disposed in the apparatus slot, the moveable positioning arm including a holder portion, a force gauge secured to the holder portion; and a force applicator operably connected to the force gauge. The test apparatus is secured to an enclosure of the computer rack system and the drawer is located in a desired position in the enclosure. The force applicator is positioned such that the force applicator contacts the drawer at a testing location, and a force is applied to the testing location via the force applicator.

1 Claim, 2 Drawing Sheets

METHOD FOR STRENGTH TESTING OF DRAWERS IN COMPUTER RACK SYSTEMS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer rack systems, and particularly to force testing of drawers of computer rack systems.

2. Description of Background

Rack systems for, for example, computer servers typically include a cabinet or other enclosure having one or more drawers which hold electronic components. The drawers often include a slide mechanism in which the drawer is connected to the cabinet via slide rails. This allows the electronic components located on the drawer to be accessed for maintenance and/or replacement by sliding the drawer partially out of the cabinet.

Cabinets and slide rail drawers are designed and manufactured to meet load requirements such that the slide rail mechanism, the drawer, and/or the cabinet do not fail when subjected to certain loads, such as weight of the electronic components installed in the drawer or other forces. Failure of the slide rail, the cabinet, or the drawer under load could lead to damage of the electronic components, and/or injury to a technician working at the cabinet. The art would be receptive to a method and apparatus capable of providing repeatable and accurate testing of cabinets, drawers and slide rail mechanisms to ensure such requirements are met.

SUMMARY OF THE INVENTION

The shortcomings of the prior art are overcome and additional advantages are provided through the provision of a method of strength testing of a drawer of a computer rack system utilizing a test apparatus including a first apparatus plate and a second apparatus plate positioned to define an apparatus slot between the first apparatus plate and the second apparatus plate. The apparatus includes a moveable positioning arm disposed in the front slot, the moveable positioning arm including a holder portion, a force gauge secured to the holder portion; and a force applicator operably connected to the force gauge. The test apparatus is secured to an enclosure of the computer rack system and the drawer is located in a desired position in the enclosure. The force applicator is positioned such that the force applicator contacts the drawer at a testing location, and a force is applied to the testing location via the force applicator.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a testing apparatus and method which is capable of obtaining accurate and repeatable measurements of drawer strength, particularly slide rails, in computer rack systems.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
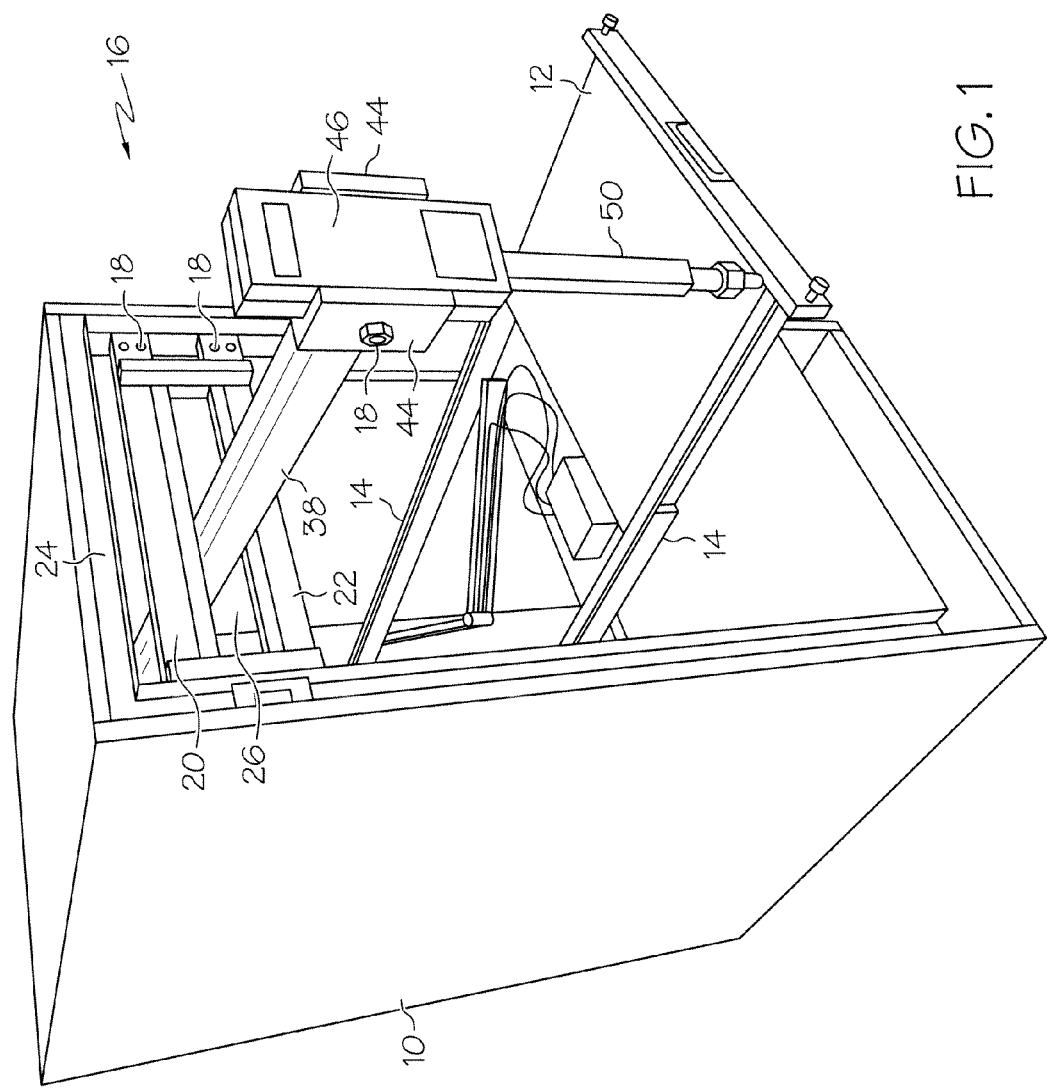
FIG. 1 illustrates one example a force testing apparatus installed in an enclosure.

Turning now to the drawings in greater detail, it will be seen that in FIG. 1 there is an enclosure 10 which has at least one drawer 12 disposed and configured to accommodate one or more electronic components (not shown) in the enclosure 10. The drawer 12 is attached to the enclosure 10 via two slide rail mechanisms 14 which allow the drawer 12 to be moved in and out of the enclosure 10.

Figure 2:
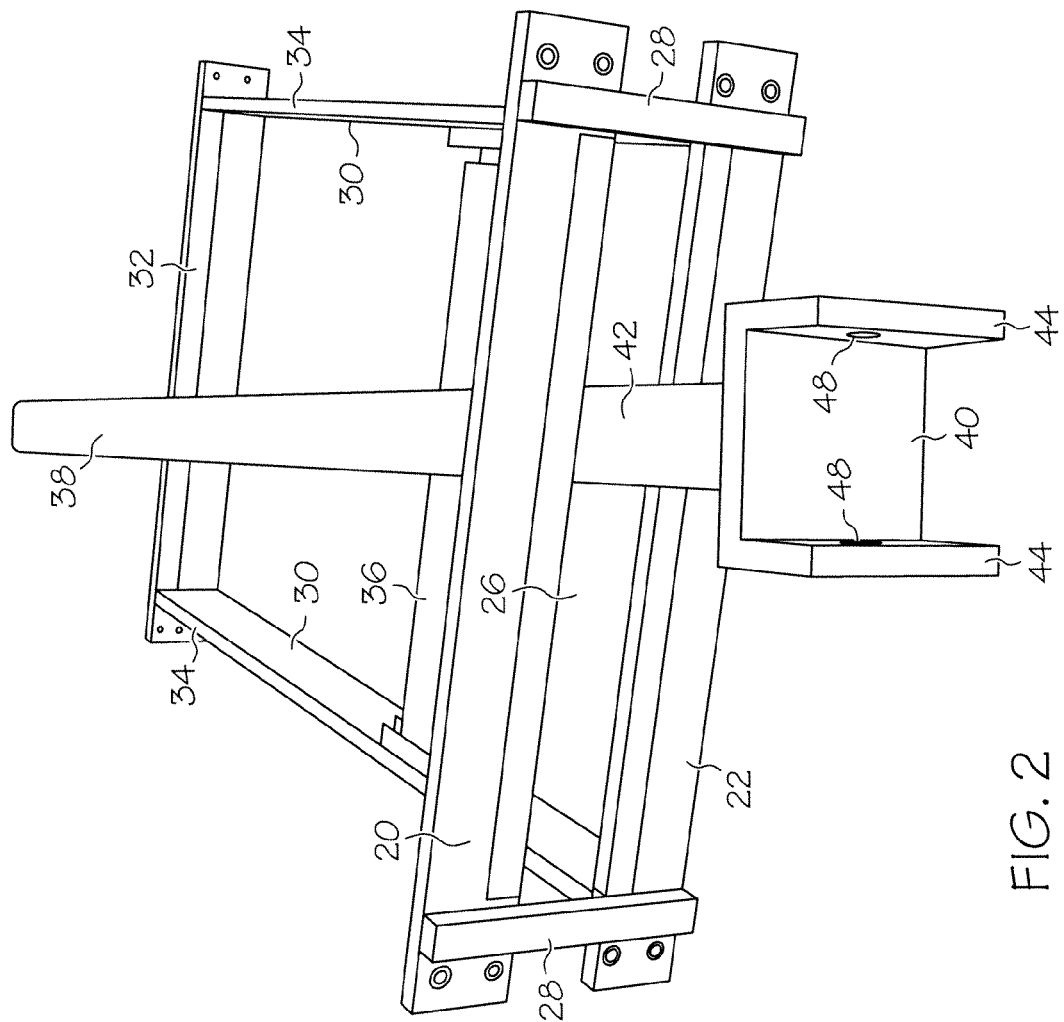
FIG. 2 illustrates a portion of the apparatus of FIG. 1 removed from the enclosure.

A test apparatus 16 is located in the enclosure 10, and is fixed to a front face 18 of the enclosure 10 by one or more threaded fasteners 18 or other means. The test apparatus 16 includes an upper front plate 20 and a lower front plate 22 which extend across a front opening 24 of the enclosure 10 and are configured such that a front slot 26 remains between the upper front plate 20 and lower front plate 22. As best shown in FIG. 2, the upper front plate 20 is connected to the lower front plate 22 via two or more end plates 28 which may be attached to the upper front plate 20 and lower front plate 22 by any suitable means, for example, welding. In some embodiments, the test apparatus 16 includes two side rails 30 which extend rearward from the lower front plate 22. A rear support 32 extends between the side rails 30 at a substantially rearward end 34 of the side rails 30. In some embodiments, the test apparatus 16 may include a mid support 36 extending between the side rails 30 and disposed between the lower front plate 22 and the rear support 32. The rear support 32 and the mid support 36 are affixed to the side rails 30 by any suitable means including, for example, by welding or by one or more threaded fasteners 18.

The test apparatus 16 includes a moveable positioning arm 38 which is inserted through the front slot 26 and extends rearward, supported by the mid support 36 and the rear support 32. The positioning arm 38 is configured so as to be freely movable from side to side in the front slot 26. A holder 40 is disposed at a forward end 42 of the positioning arm 38. In some embodiments, as shown in FIG. 2, the holding includes two holder arms 44 extending from the forward end 42 of the positioning arm 38. Referring again to FIG. 1, the holder 40 is configured such that a measurement device, for example, a force gauge 46 is securable therein. As shown in FIG. 1, the force gauge 46 is secured to the holder 40 by at least one threaded fastener 18 extending through an arm hole 48, best shown in FIG. 2, disposed in at least one holder arm 44, which applies a clamping load to the force gauge 46 to hold the force gauge 46 in a desired position.

A force applicator 50 is affixed to the force gauge 46 and is configured to apply a desired force to a test location on the drawer 12. In operation, the test apparatus 16 is utilized to test a strength of the drawer 12 and/or the slide rail mechanisms 14. The force gauge 46 is fixed to the holder 40, and the positioning arm 38 is moved such that the force applicator 50 is at a desired position over the drawer 12. Force is applied to the drawer 12 through the force applicator 50 in a desired direction, for example, downward, until a test result is achieved. The resulting data from the force gauge 46 is then recorded. For example, force may be applied until a maximum required force is achieved, or until there is a failure of the drawer 12 and/or one or more of the slide rail mechanisms 14. The testing may be repeated as desired at other locations on the drawer 12 by simply moving the positioning arm 38 to the other locations.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of strength testing of a drawer of a computer rack system comprising:

securing a test apparatus in an enclosure of the computer rack system, the test apparatus including:
- a first apparatus plate;
- a second apparatus plate positioned to define an apparatus slot between the first apparatus plate and the second apparatus plate;
- a moveable positioning arm disposed in the apparatus slot, the moveable positioning arm including a holder portion;
- a force gauge secured to the holder portion; and
- a force applicator operably connected to the force gauge;

locating the drawer in a desired position in the enclosure;

positioning the force applicator such that the force applicator contacts the drawer at a testing location; and applying a force to the testing location via the force applicator.

* * * * *